United States Patent [19]

Scharf

[11] 4,455,118
[45] Jun. 19, 1984

[54] OPPOSED CYLINDER CABLE HOIST MECHANISM

[75] Inventor: Heino W. Scharf, Knoxville, Tenn.

[73] Assignee: Dempster Systems Inc., Knoxville, Tenn.

[21] Appl. No.: 303,545

[22] Filed: Sep. 18, 1981

[51] Int. Cl.³ .............................................. B60P 1/16
[52] U.S. Cl. .................................... 414/494; 414/496; 414/538; 414/557; 414/571; 254/386; 74/110
[58] Field of Search ............... 414/494, 496, 506, 538, 414/500, 516, 559, 571; 254/385, 386; 74/110

[56] References Cited

U.S. PATENT DOCUMENTS

| | | |
|---|---|---|
| 462,955 | 11/1891 | McAdam ........................... 254/386 |
| 1,885,399 | 11/1932 | Wren . |
| 2,530,350 | 11/1950 | Ehlert . |
| 3,049,378 | 8/1962 | Nelson . |
| 3,074,574 | 1/1963 | Prince . |
| 3,897,882 | 8/1975 | Budoff . |
| 3,964,626 | 6/1976 | Arregui . |
| 4,109,810 | 8/1978 | Jones . |
| 4,130,211 | 12/1978 | Abascal ............................. 414/500 |
| 4,133,439 | 1/1979 | Goranson .......................... 414/494 |
| 4,274,788 | 6/1981 | Sutton ............................... 414/559 |

FOREIGN PATENT DOCUMENTS 8345 of 1903 United Kingdom ............... 254/386

Primary Examiner—Bruce H. Stoner, Jr.
Assistant Examiner—James E. Barlow
Attorney, Agent, or Firm—Jacox & Meckstroth

[57] ABSTRACT

Hoist mechanism for a truck vehicle of the type having a pivotally movable load support frame. Opposed piston hydraulic cylinders are carried by the load support frame. Each of the hydraulic cylinders has a piston rod to which is attached a rotatable sheave. Another sheave is rotatably attched to the load support frame. A cable has one end thereof attached to the load support frame. The cable has portions in engagement with the sheaves and has a free end adapted to be attached to a load. A load is thus drawn upon the load support frame as the hydraulic cylinders are operated.

4 Claims, 7 Drawing Figures

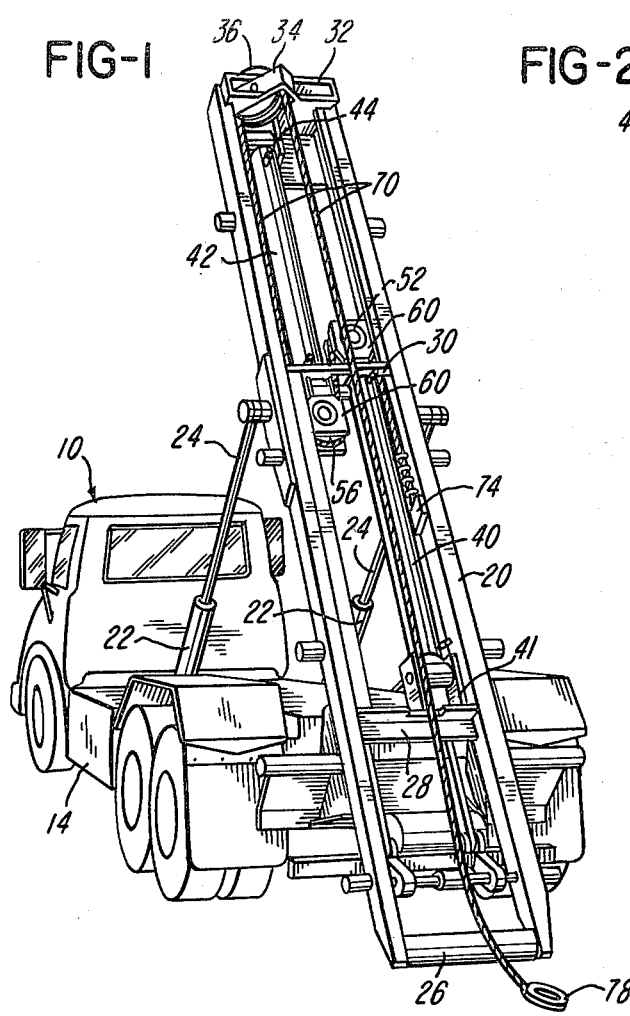
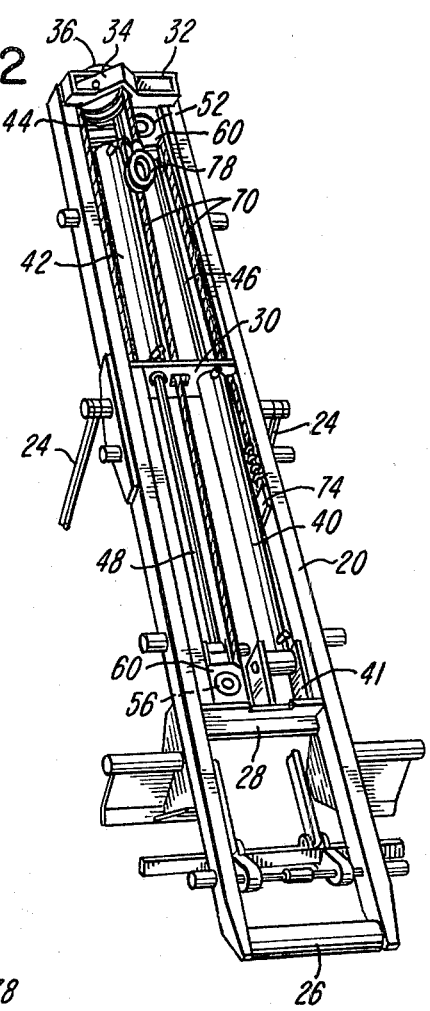
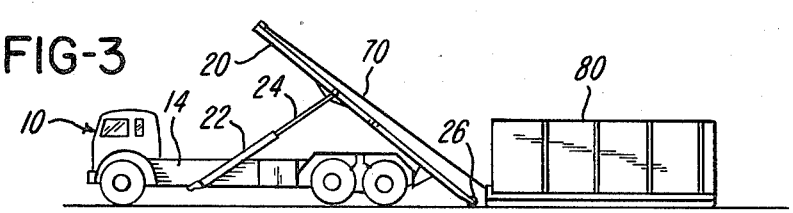
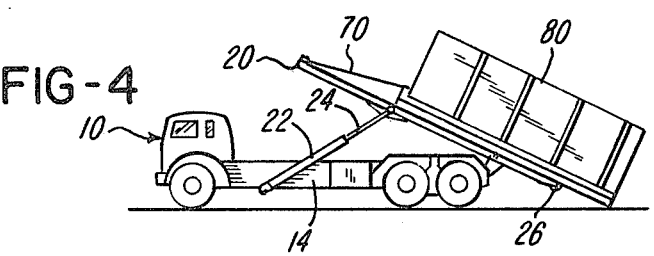
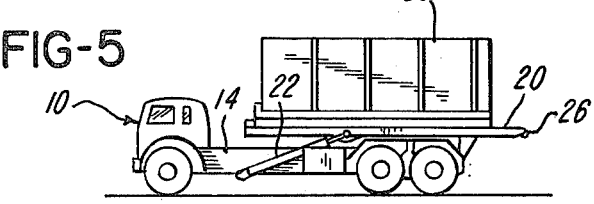

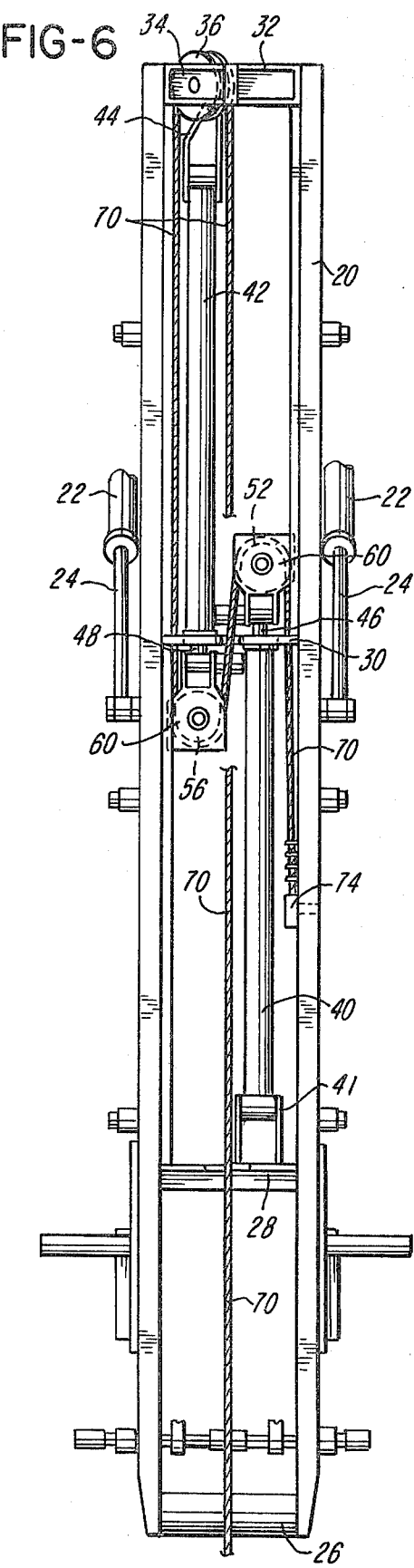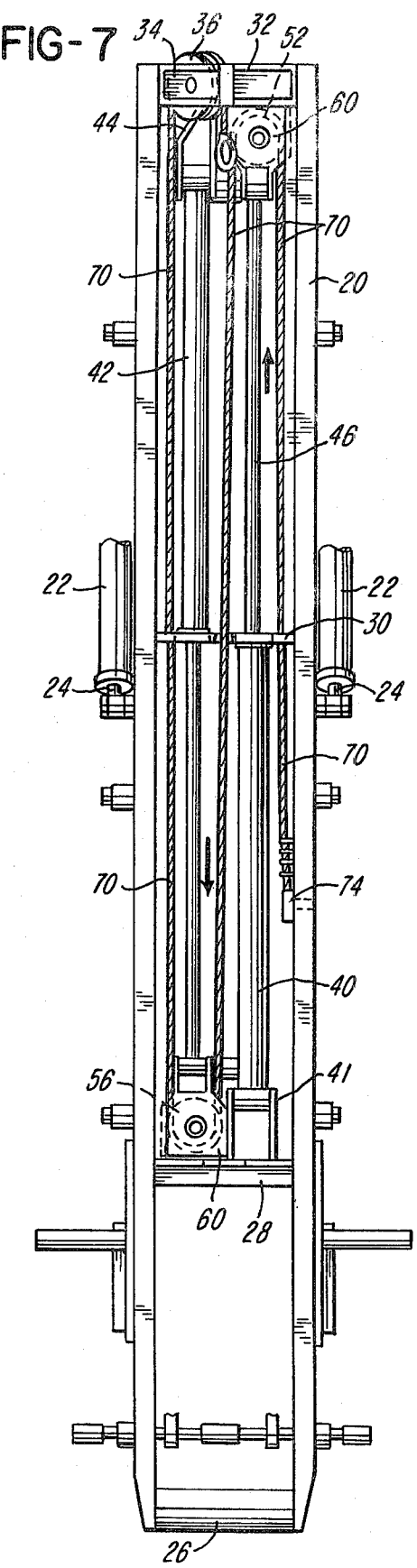

OPPOSED CYLINDER CABLE HOIST MECHANISM

BACKGROUND OF THE INVENTION

Certain truck and trailer vehicles are of the type which have a pivotally movable load support frame attached to the chassis thereof. The truck or trailer includes power means to pivotally move the load support frame. Such a truck or trailer may be adapted to load a container thereupon, to transport the container to another location and to unload the container at the second location. Such a truck or trailer includes means carried by the load support frame to draw a load thereupon as the load support frame is pivotally moved. Usually a cable is used to draw the load upon the load support frame. The cable may be wound upon and operated by a rotatable drum, or the cable may be operated by one or more linearly operable fluid motors, such a hydraulic cylinders or the like.

It is an object of this invention to provide hoist mechanism for a truck or trailer having a pivotally movable load support frame in which a cable is employed for moving a load upon the frame and in which the cable is moved by a plurality of linearly operable fluid motors and in which a minimum number of moving parts, such as sheaves, is employed.

Another object of this invention is to provide such hoist mechanism which is capable of moving a load the complete length of the load support frame and at a significant rate.

Other objects and advantages of this invention reside in the construction of parts, the combination thereof, the method of production and the mode of operation, as will become more apparent from the following description.

BRIEF DESCRIPTION OF THE VIEWS OF THE DRAWINGS

FIG. 1 is a rear perspective view of a truck provided with a pivotally movable load support frame and showing the hoist mechanism of this invention in which a cable is employed for drawing a load upon the frame. This view shows the cable extended from the load support frame.

FIG. 2 is a rear perspective view of a portion of the structure illustrated in FIG. 1, showing the cable drawn upwardly upon the frame.

FIG. 3 is a side elevational diagrammatic view, drawn on a much smaller scale than FIGS. 1 and 2, illustrating the manner of use of this invention in which the cable is attached to a container as the load support frame is inclined to receive the container.

FIG. 4 is a diagrammatic view similar to FIG. 3, illustrating a position of movement of the container upon the load support frame, as the container is drawn upon the load support frame by the cable.

FIG. 5 is a diagrammatic view, similar to FIGS. 3 and 4, showing the container, completely positioned upon the load support frame.

FIG. 6 is a plan view, drawn on a larger scale than the other figures, of the hoist mechanism of this invention, with the cable thereof extended from the load support frame.

FIG. 7 is a plan view, similar to FIG. 6, showing the cable of the mechanism in its full drawn position.

DETAILED DESCRIPTION OF THE INVENTION

FIGS. 1, 3, 4, and 5 show a truck 10 provided with a chassis 14. Pivotally attached to the chassis 14 adjacent the rear portion thereof is a tipping frame or load support frame 20. It is to be understood that the tipping frame or load support frame 20 may be part of a trailer or the like, rather than a part of a truck.

Fluid motors or cylinders 22 are pivotally attached to the chassis 14 at opposed portions thereof. Each of the cylinders 22 has an actuator rod 24 extending therefrom which is linearly movable with respect ot the cylinder 22 by the force of fluid therewithin. The rods 24 are also attached to the load support frame 20. The cylinders 22 are joined to fluid supply lines, not shown, for introduction of fluid into the cylinders 22, for movement of the actuator rods 24 with respect to the cylinders 22. Thus, with introduction of fluid into the cylinders 22, the actuator rods 24 move in a direction from the cylinders 22, and the load support frame 20 is pivotally moved to an inclined position. FIGS. 1, 2, and 3 show the load support frame 20 in its maximum inclined position. In this maximum inclined position, an elongate roller 26 at the rear portion of the load support frame 20 is in engagement with the ground or other surface upon which the truck 10 is supported.

The load support frame 20 includes a rear transverse support frame member 28, an intermediate transverse support frame member 30, and a forward transverse support frame member 32. A bracket 34 attached to the forward frame member 32 rotatably supports a sheave 36 at an angle with respect to the load support frame 20.

A fluid motor or elongate cylinder 40 is supported by the transverse support members 28 and 30 and is positioned therebetween. A bracket 41 attaches one end of the cylinder 40 to the rear transverse support member 28. A fluid motor or cylinder 42 is supported by the intermediate transverse support member 30 and by the forward transverse frame member 32 and is positioned therebetween. A bracket 44 attaches one end of the cylinder 42 to the forward transverse frame member 32.

The cylinder 40 has an actuator rod 46 axially and linearly movable with respect thereto, an the cylinder 42 has an actuator rod 48 axially and linearly movable with respect thereto. Fluid is introduced into the cylinders 40 and 42 through conduits, not shown, for movement of the actuator rods 46 and 48 with respect to the fluid motors or cylinders 40 and 42, respectively. The actuator rod 46 has a rotatable sheave 52 at the end thereof, and the actuator rod 48 has a rotatable sheave 56 at the end thereof. Partially enclosing each of the sheaves 52 and 56 is a guide member 60 thereto which is attached to its respective actuator rod 46 and 48 and is slidably movable along a portion of the load support frame 20.

A cable 70 has one end portion thereof attached to the support frame 20 by means of a connector member 74. The cable 70 extends from the connector member 74, through the transverse support member 30, then around a part of the sheave 52, then back through the transverse support member 30, and around a part of the sheave 56, then back through the transverse support member 30 and around a part of the sheave 36. The cable 70 extends normally from the sheave 36 back over the transverse support member 30. A load connector ring 78 is attached to the free end of the cable 70.

OPERATION

The hoist mechanism of this invention is normally employed to draw a load, such as a container, upon the support frame 20. In this operation, the rear of the truck 10 is positioned adjacent a load, such as a container load 80, illustrated in FIGS. 3, 4, and 5. The load support frame 20 is pivotally moved to the position illustrated in FIG. 3 in which the roller 26 is in engagement with the ground or surface upon which the load 80 is supported. The cable 70 and the actuator rods 46 and 48 are then positioned as illustrated in FIGS. 1 and 6. The load connector ring 78 is attached to the load 80. Then fluid is forced to flow within the cylinders 40 and 42, and the actuator rods 46 and 48 move therefrom. As the actuator rods 46 and 48 move in directions from the cylinders 40 and 42, the cable 70 is drawn over the sheaves 52, 56, and 36, as illustrated in FIG. 7, and the load ring 78 is drawn upwardly upon the load support frame 20, as illustrated in FIG. 2. Thus, the load 80 is drawn upon the load support frame 20. As illustrated in FIGS. 4 and 5, as the load 80 is drawn upon the support frame 20, the cylinders 22, and the actuator rods 24 thereof are operated to pivotally lower the support frame 20 to a substantially horizontal position upon the chassis 14. Thus, the load 80 is placed upon the support frame 20 of the truck 10, as illustrated in FIG. 5.

Therefore, it is understood that the hoist mechanism of this invention makes possible the drawing of a load through a significant distance by means of mechanism which occupies a minimum space and in which the number of sheaves is a minimum.

Although the preferred embodiment of the opposed cylinder cable hoist mechanism of this invention has been described, it will be understood that within the purview of this invention various changes may be made in the form, details, proportion and arrangement of parts, the combination thereof, and the mode of operation, which generally stated consist in a mechanism within the scope of the appended claims.

The invention having thus been described, the following is claimed:

1. In a vehicle including a chassis supporting an elongated load support frame for pivotal movement on a horizontal axis, the frame including parallel spaced longitudinally extending frame members rigidly connected by longitudinally spaced cross frame members and having a forward portion and a rearward portion, and power actuated means for tilting the frame between a generally horizontal position and an inclined position with the forward portion being elevated and the rearward portion being lowered to provide for moving a refuse container or other load onto the frame, an improved and simplified hoist mechanism for pulling the load onto the frame while the frame is in its inclined position, comprising a first fluid actuated cylinder extending longitudinally within the forward portion of the frame to one of the cross frame members and supporting an actuating piston rod extendable longitudinally into the rearward portion of the frame, a second fluid actuated cylinder extending longitudinally within the rearward portion of the frame to one of the cross frame members and supporting an actuating piston rod extendable longitudinally within the forward portion of the frame in laterally spaced relation to the first fluid actuated cylinder, first and second sheaves, there being a sheave mounted on each of the piston rods and movable therewith, an elongated cable having one end portion secured to the frame and extending forwardly to the sheave on the piston rod of the second fluid cylinder, the cable than extending rearwardly between the fluid actuated cylinders to the sheave on the piston rod of the first fluid actuated cylinder, a third sheave supported by the forward end portion of the frame, the cable extending forwardly from the sheave on the piston rod of the first fluid actuated cylinder to the third sheave, and the cable extending rearwardly from the third sheave and having a rearward end portion with means for connecting to the load.

2. A vehicle as defined in claim 1 wherein the cable extends substantially 180 degrees around each of the sheaves.

3. A vehicle as defined in claim 2 wherein the cable extends substantially parallel to the longitudinally extending frame members except when the cable extends around the sheaves.

4. The hoist mechanism of claim 1 in which the third sheave rotates about an axis which is angular with respect to the axes of rotation of the first sheave and the second sheave.

* * * * *